(12) United States Patent
Cannon et al.

(10) Patent No.: US 7,184,187 B2
(45) Date of Patent: Feb. 27, 2007

(54) OPTICAL SYSTEM FOR TORSION OSCILLATOR LASER SCANNING UNIT

(75) Inventors: Roger Steven Cannon, Nicholasville, KY (US); Wilson Morgan Routt, Jr., Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 193 days.

(21) Appl. No.: 11/034,168

(22) Filed: Jan. 12, 2005

(65) Prior Publication Data

US 2005/0134143 A1   Jun. 23, 2005

Related U.S. Application Data

(63) Continuation-in-part of application No. 10/689,175, filed on Oct. 20, 2003, now Pat. No. 6,794,794.

(51) Int. Cl.
*G02B 26/08* (2006.01)
(52) U.S. Cl. .................... 359/213; 359/223
(58) Field of Classification Search ............. None
See application file for complete search history.

(56) References Cited

U.S. PATENT DOCUMENTS

| | | | |
|---|---|---|---|
| 5,543,956 A | 8/1996 | Nakagawa et al. |
| 5,606,447 A | 2/1997 | Asada et al. |
| 5,629,790 A | 5/1997 | Neukermans et al. |
| 5,767,666 A | 6/1998 | Asada et al. |
| 5,959,760 A | 9/1999 | Yamada et al. |
| 6,069,727 A | 5/2000 | Cho et al. |
| 6,075,639 A | 6/2000 | Kino et al. |
| 6,122,090 A | 9/2000 | Kino et al. |
| 6,794,794 B2 | 9/2004 | Klement |
| 6,803,938 B2 | 10/2004 | Turner |
| 6,812,669 B2 | 11/2004 | Hagen |
| 6,838,661 B2 | 1/2005 | Klement |
| 6,844,951 B2 | 1/2005 | Cannon et al. |

*Primary Examiner*—Euncha P. Cherry
(74) *Attorney, Agent, or Firm*—Luedeka, Neely & Graham (57) ABSTRACT

An optical apparatus compensates for imaging errors associated with the sinusoidal angular scan rate of a light beam reflected from a bidirectional scanning torsion oscillator. The compensation is achieved by a combination of pre-scan optics positioned between the source of the light beam and the scanning torsion oscillator, and post-scan optics positioned between the scanning torsion oscillator and an imaging surface of an imaging device. Based on the optical characteristics of its components, the post-scan optical system causes deflection of the light beam in the scan direction. To compensate for the sinusoidal scan rate, the deflection caused by the post-scan optical system is greater at the opposing edge positions of the imaging surface than at a central position. In this manner, the scan rate of the light beam at the first and second edge positions is substantially equivalent to the scan rate at the central position. The pre-scan optical system directs the light beam onto the reflective surface of the torsion oscillator in a manner that compensates for divergence of the light beam in the scan direction caused by the post-scan optical system.

22 Claims, 8 Drawing Sheets

SECTION F-F
Fig. 8B

SECTION G-G
Fig. 8C

OPTICAL SYSTEM FOR TORSION OSCILLATOR LASER SCANNING UNIT

This application is a continuation-in-part of U.S. patent application Ser. No. 10/689,175, filed Oct. 20, 2003 now U.S. Pat. No. 6,794,794, entitled BI-DIRECTIONAL GALVONOMETRIC SCANNING AND IMAGING, which issued as U.S. Pat. No. 6,794,794 on Sep. 21, 2004.

BACKGROUND OF THE INVENTION

The invention relates generally to optical systems used in laser printers, and, more particularly, to an optical lens system for correcting linearity errors associated with torsion oscillator mirrors having a sinusoidal scan angle motion.

Torsion oscillators with a mirrored surface are used in laser printers to scan a laser beam bi-directionally across a laser printer drum. Generally, the scan angle of the mirrored surface of the torsion oscillator varies sinusoidally with respect to time. At the angular extremes of the sinusoidal motion—the point at which the scan reverses direction—the rate of change of the scan angle slows to zero. Due to the decreasing rate of angular change at the scan extremes, dots imaged at a constant rate on a photoconductor of a laser printer are more closely spaced together at the scan extremes than in the middle of the scan line, if there is no optical correction of the scanned laser beam. This causes linearity errors at the ends of the scan line which results in unacceptable print defects in a laser printer application.

What is needed, therefore, is an optical system for correcting linearity errors introduced by the sinusoidal scan angle motion produced by a torsion oscillator mirror in a laser printer.

SUMMARY OF THE INVENTION

In one aspect, the invention provides an optical apparatus that compensates for imaging errors associated with the sinusoidal angular scan rate of a light beam reflected from a bidirectional scanning torsion oscillator. According to the invention, the light beam, such as produced by a laser light source, propagates along an optical path from the light source to a reflective surface of the torsion oscillator, which reflects the beam toward the imaging surface of an imaging device. Based on the sinusoidal motion of the reflective surface of the torsion oscillator, the light beam is scanned from a first edge position through a central position to a second edge position on the imaging surface.

The optical apparatus includes a post-scan optical system disposed in the optical path of the light beam between the reflective surface of the scanning torsion oscillator and the imaging surface of the optical imaging system. Based on the optical characteristics of its components, the post-scan optical system causes deflection of the light beam in the scan direction. To compensate for the sinusoidal angular scan rate introduced by the torsion oscillator, the post-scan optical system causes the deflection of the beam to be greater as the beam approaches the extreme scan positions. In this manner, the scan rate of the light beam at the first and second edge positions is substantially equivalent to the scan rate at the central position.

In preferred embodiments of the invention, the post-scan optical system comprises a first post-scan lens and a second post-scan lens. The first post-scan lens of these embodiments has at least one surface defined by a radius of curvature that varies in the scan direction. The second post-scan lens of these embodiments has at least one surface defined by a radius of curvature that varies in the process direction, which is orthogonal to the scan direction and the propagation direction.

Some preferred embodiments of the invention include a pre-scan optical system disposed in the optical path of the light beam between the light source and the scanning reflective surface of the torsion oscillator. The pre-scan optical system directs the light beam onto the reflective surface in a manner that compensates for the divergence of the light beam in the scan direction introduced by the post-scan optical system, such that the light beam is substantially focused at all points across the imaging surface.

In some preferred embodiments, the pre-scan optical system comprises, first and second pre-scan lenses. The first pre-scan lens of these embodiments has substantially the same focusing characteristics in the scan direction as in a process direction. The second pre-scan lens of these embodiments has a cylindrical first surface defined by a fixed radius of curvature in the process direction and an essentially infinite radius of curvature in the scan direction, and a planar second surface.

In another aspect, the invention provides an optical imaging system comprising a light source, pre-scan optics, a bidirectional scanning torsion oscillator, post-scan optics, and an imaging device. According to the invention, the light source, such as a laser diode, produces a light beam that propagates along an optical path. The pre-scan optics receive the light beam, directs it to a reflective surface of the scanning torsion oscillator, and modifies the divergence of the light beam in the scan direction. The scanning torsion oscillator receives the light beam from the pre-scan optics and reflects the beam from the reflective surface that oscillates according to a sinusoidal function. Based on the motion of the reflective surface, the torsion oscillator causes the reflected light beam to scan back and forth at a sinusoidal angular rate across an imaging surface of the imaging device. In this manner, the beam is scanned from a first edge position through a central position to a second edge position on the imaging surface.

The post-scan optics are positioned in the optical path of the beam between the torsion oscillator and the imaging surface of the imaging device. The post-scan optics receive the reflected light beam from the scanning torsion oscillator and cause deflection of the reflected light beam in the scan direction. According to the invention, the beam deflection in the scan direction introduced by the post-scan optics is greater at the first and second edge positions of the imaging surface than at the central position. Due to varying levels of the post-scan beam deflection, the scan rate of the light beam at the first and second edge positions is substantially equivalent to the scan rate at the central position. In this manner, the post-scan optics compensate for imaging errors associated with the sinusoidal scan rate of the light beam reflected from the torsion oscillator.

DETAILED DESCRIPTION

Prior patents assigned to the assignee of the present invention have described the construction and operation of the torsion oscillator, including the placement of coil(s) and magnet(s) that together create rotational movement when electrical drive power is applied to the coil. These prior patents include: U.S. Pat. No. 6,838,661 which issued Jan. 4, 2005; U.S. Pat. No. 6,870,560 which issued Mar. 22, 2005; and U.S. Pat. No. 6,794,794 which issued Sep. 21, 2004, the entire disclosures of which are hereby expressly incorporated by reference.

Figure 1:
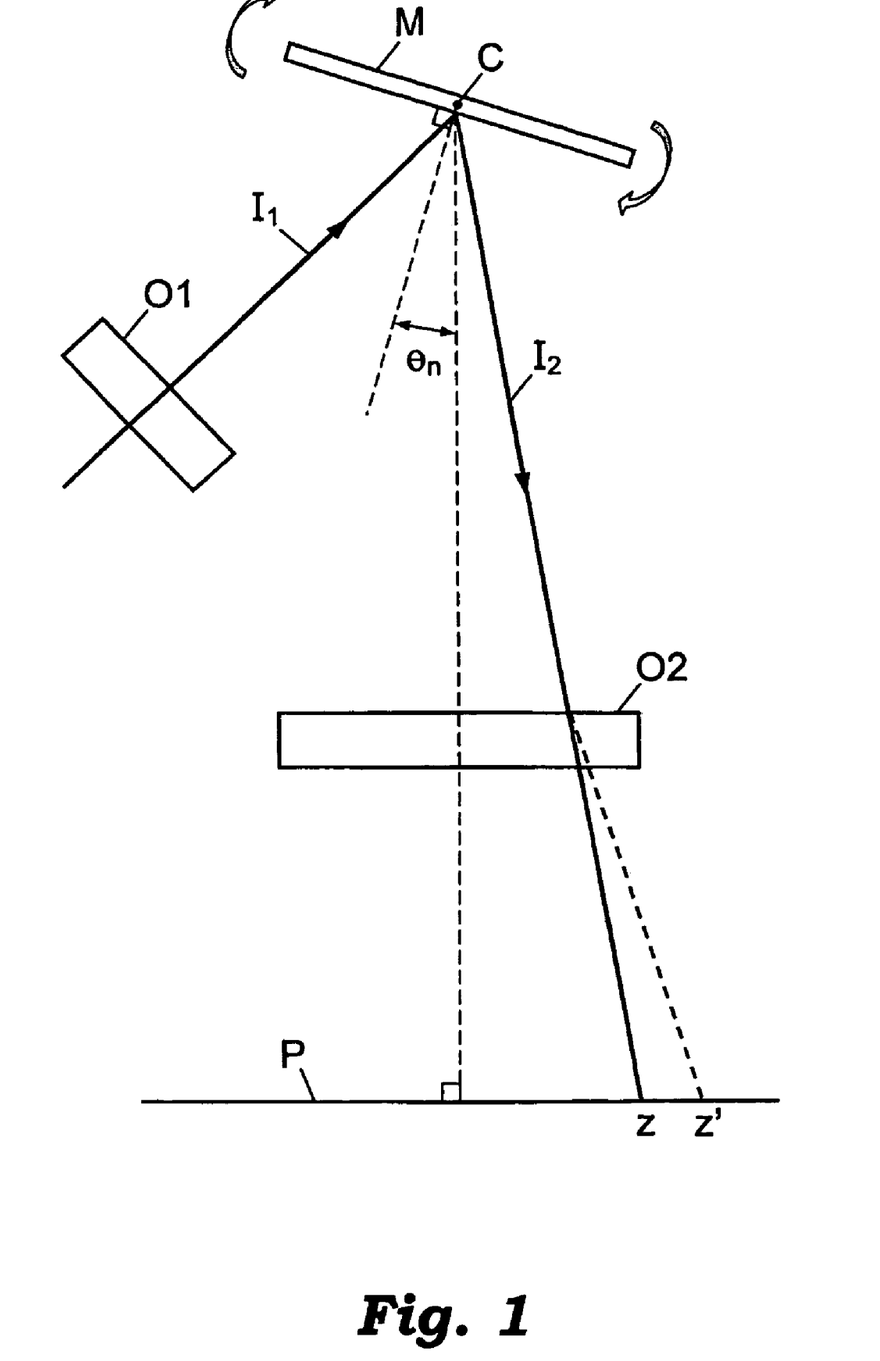
FIG. 1 depicts a functional block diagram of an optical system scanning mirror.

The nature of the problem solved by the present invention is depicted in FIG. 1. A rotational planar mirror M in a laser printer, having a center of rotation C, deflects a laser light beam I1 to form a reflected beam I2. Prior to reflection from the mirror M, the beam I1 intersects an optical system O1 of lenses and/or mirrors. The angular rotation of the mirror M about the center C is a periodic function of time. The reflected beam I2 interacts with an optical system O2 of lenses and/or mirrors and intersects an imaging plane P at a point z'. In the absence of the optical system O2, the intersection of the beam I2 with the plane P would occur at a point z.

The optical systems O1 and O2 are designed to accomplish two main objectives as the beam I2 scans across the plane P:

(1) The point of intersection z' of the beam I2 with the plane P moves at a sufficiently constant rate of speed during a single angular sweep of the mirror M so that image pixels generated in the imaging plane P will be separated by a distance that is nearly linearly dependent upon the time interval between pixels.

(2) Based on the combined effects of O1 and O2, the beam I2 has its minimum diameter (focal point or waist) occur sufficiently close to the plane P as the beam I2 scans across the plane P, where that minimum beam diameter measured in the direction of scan motion is sufficiently close to some desired diameter.

To meet objective (1), the optical system O2 modifies or deflects the path of the beam I2. To meet objectives (2), the optical system O2 changes the divergence and/or size of the beam I2. In a scanning optical system, the alteration of beam direction and beam divergence are necessarily coupled.

Without the optical system O2, the position of intersection point z is represented by $$z = D \tan(\theta_n),$$

where D is the normal distance from the center of rotation C to the plane P. For a resonant galvanometric rotational mirror, the steady-state angular position of the mirror may approximate $$\theta_n(t) = \theta_{max} \cos(2\pi f t),$$

where $\theta_{max}$ is the maximum scan angle of the mirror M. For the system depicted in FIG. 1, the speed of movement of a laser spot formed at any point z within the plane P is expressed as $$\frac{dz}{dt} = \frac{-2\pi f D \theta_{max} \sin(2\pi f t)}{\cos^2(\theta_n(t))}.$$

Figure 2:
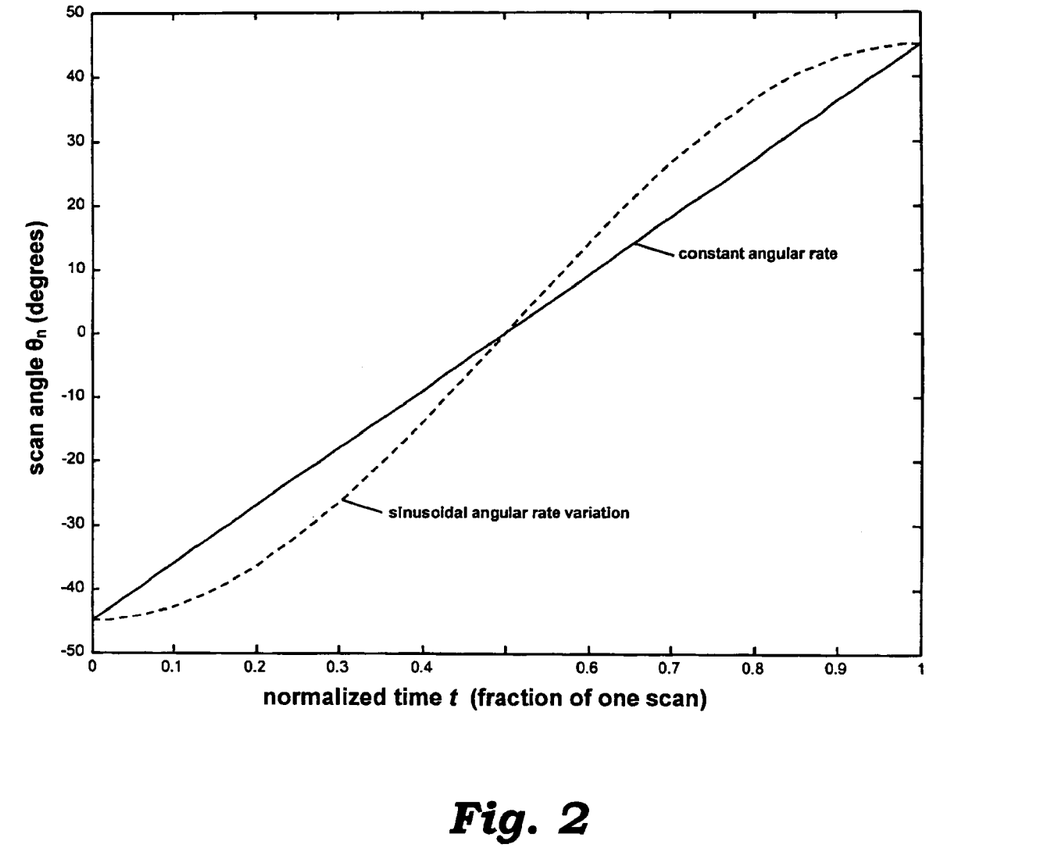
FIG. 2 depicts a graph of mirror scan angle versus time for a mirror scanning for sinusoidal scan rate and a constant scan rate.
Figure 3:
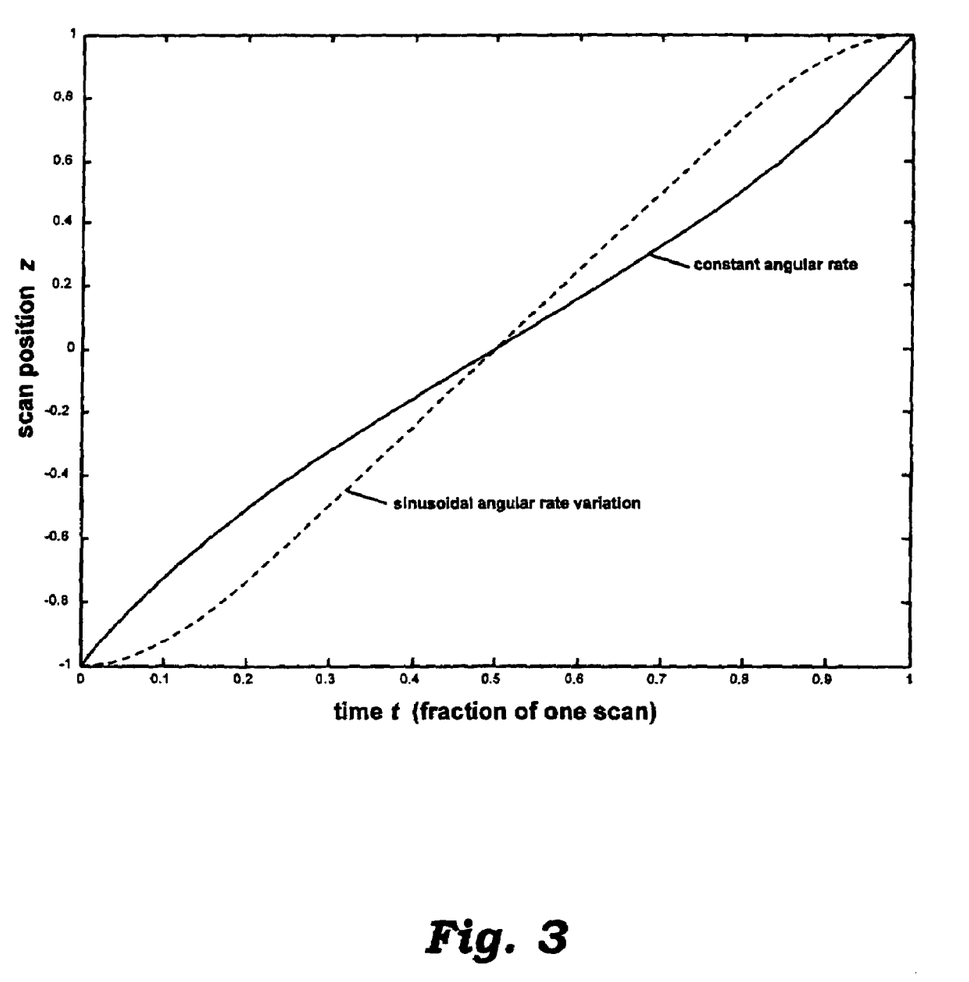
FIG. 3 depicts a graph of laser spot position versus time for a mirror scanning at a sinusoidal scan rate and a constant scan rate.

FIG. 2 depicts the mirror scan angle $\theta_n$ versus normalized time t during a single scan of the mirror M, and FIG. 3 depicts the corresponding scan position z on the image plane versus normalized time t during a single scan. The dashed curve in FIGS. 2 and 3 depicts the result for a sinusoidal variation in the scan rate $$\frac{dz}{dt}$$

(such as occurs with a oscillating mirror) and for a constant variation in the scan rate $$\frac{dz}{dt}$$

(such as occurs with a polygonal mirror). The results are depicted without modification by the optical system O2. The graphs of FIGS. 2 and 3 are generated with D=1 and with the mirror scan angle $\theta_n$ ranging from −45 degrees to +45 degrees. The normalized time t is given in fractions of a single scan duration ($0 \leq t \leq 1$).

It should be appreciated that the angular scan rates depicted in FIG. 2 result in the laser spot positions z on the plane P as depicted in FIG. 3. The effect of a constant angular rate (solid line) is to produce increasing spot-to-spot distance with increasing scan angle magnitude. Decreasing angular rate (dashed line) in the sinusoidal scan results in decreasing spot-to-spot distance with increasing scan angle magnitude.

Figure 4:
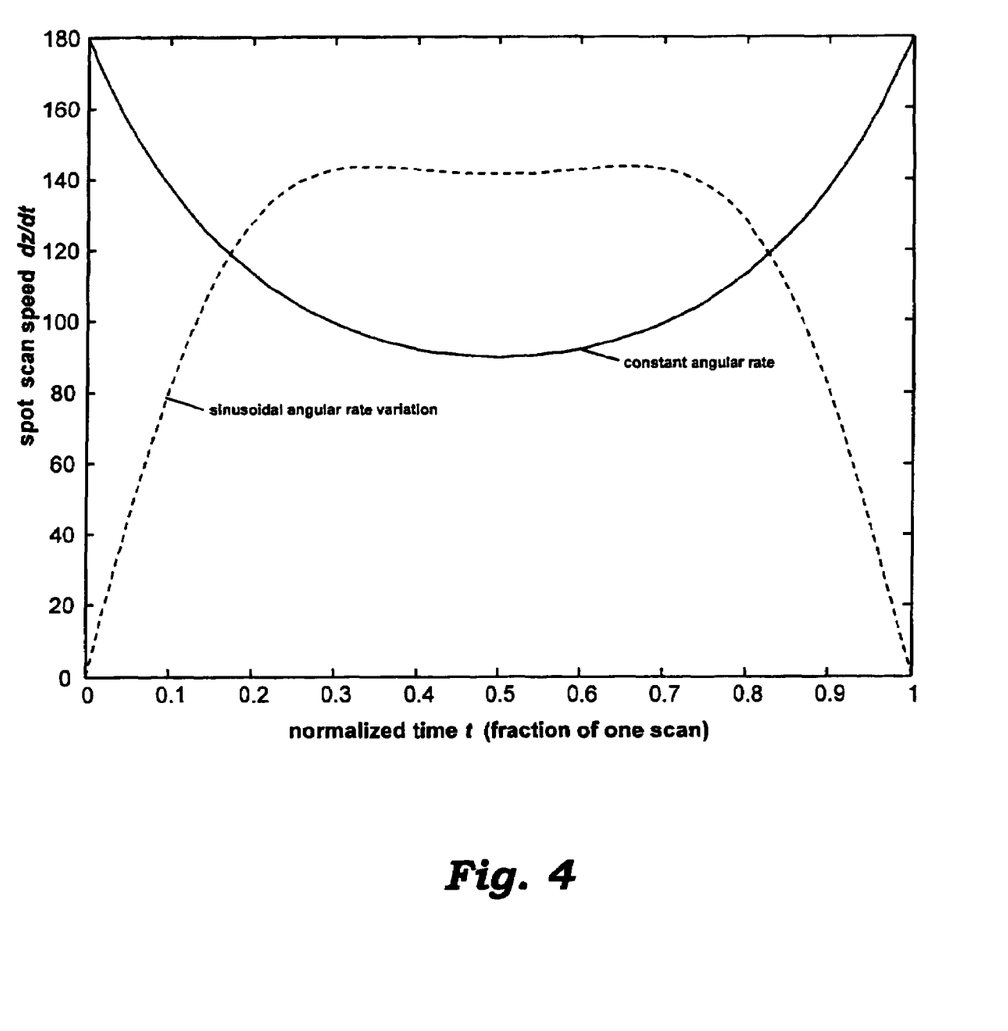
FIG. 4 depicts a graph of laser spot speed on the image plane versus time scanning at a sinusoidal scan rate and a constant scan rate.

As depicted in FIG. 4, the rate of change of spot position with time $$\frac{dz}{dt}$$

during a scan at a constant scan rate (solid curve) is strikingly different from the case of a sinusoidal scan rate (dashed curve). FIG. 4 indicates that spots generated at equal time intervals will have quite different spot-to-spot spacings at different portions of a single scan. Spot spacing variations have a significant effect on gray scale printing, and can have a cumulative effect on both character spacing in text printing and line segment length. In some prior art laser printers, the effect has been reduced by printing only over a portion of the total scan. In other prior art printers, optical correction has been employed to maximize the region over which useful spot spacing constancy can be maintained.

In printers having a constant angular rate of scan, such as provided by a polygon mirror, a single optical system in the path of the deflected beam has been effective in focusing the beam and reducing scan velocity at the edges of the scan. However, in printers having an oscillating mirror that produces a sinusoidal scan rate, lenses that increase the deflection of the beam and reduce the scan speed will cause a reduction in the portion of the scan which can be used for printing.

According to the present invention, the optimal optical design for a sinusoidally oscillating mirror includes an optical system O2 having a lower positive optical power than would be used in the case of constant angular scan rate, and in some instances having an overall negative power. Also, in preferred embodiments of the invention, the beam convergence required to produce a focal point on the plane P is provided by an optical system O1 positioned in the beam path prior to the incidence of the beam I1 on the scanning mirror M. Preferred embodiments of the optical systems O1 and O2 are described hereinafter.

Figure 5:
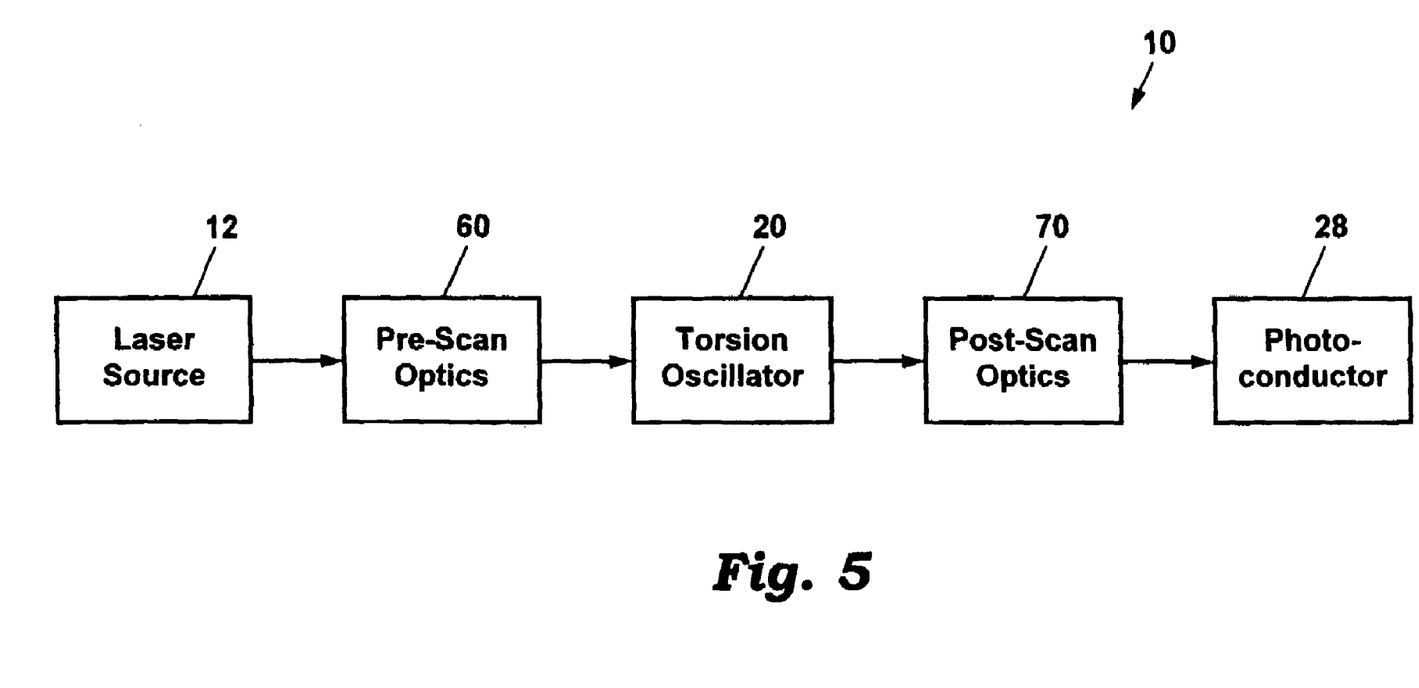
FIG. 5 depicts a functional block diagram of an optical system for correcting scan angle nonlinearity errors produced by a torsion oscillator scanning mirror according to a preferred embodiment of the invention.

Shown in FIG. 5 is a functional block diagram of a preferred embodiment of an optical system 10 for correcting linearity errors introduced by a torsion oscillator having a sinusoidal scan angle motion, such as that depicted in FIG. 1. The system 10 generally includes a laser light source 12, pre-scan optics 60, a torsion oscillator 20, post-scan optics 70, and an imaging surface 28, such as photoconductor surface of the drum of a laser printer. As described in further detail herein, the optical system 10 of the present invention increases the laser spot spacing at the edges of the scan while creating laser spots that are essentially uniformly focused within the entire scan line on the photoconductor surface.

In the description of the invention herein, the term "pre-scan" refers to optical components positioned in the optical path of the laser beam between the laser source 12 and the mirror of the torsion oscillator 20. The term "post-scan" as used herein refers to optical components positioned in the optical path between the mirror of the torsion oscillator 20 and the photoconductor surface of the printer drum 28.

The term "scan direction" as used herein refers to the direction parallel to the plane in which the beam is scanned and perpendicular to the beam axis in the pre-scan and post-scan optics. In the post-scan optics, the scan direction is also parallel to the line on the photoconductor at which the dots are printed (referred to herein as the writing line). The scan direction in the post-scan optics is indicated by the arrow 30 in FIGS. 6, 7B and 8B.

The term "process direction" as used herein refers to the direction that is perpendicular to the scan direction and the beam axis in the pre-scan and post-scan optics. The process direction in the post-scan optics is indicated by the arrow 38 in FIGS. 7C and 8C.

To achieve increased laser spot spacing near the extremes of the scan while maintaining uniform focus of the dots within the entire scan line, a preferred embodiment of the invention includes post-scan optics 70 as depicted in FIGS. 6, 7A–C and 8A–C. In the preferred embodiment of the invention, the post-scan optics 70 comprise a two-lens non-focusing optical system. One surface of one of the two post-scan lenses preferably has a varying radius of curvature in the scan direction, and one surface of the other of the two lenses preferably has a varying radius of curvature in the process direction. The invention also provides pre-scan optics 60 to compensate for the negative optical power of the post-scan optics 70. The combination of the pre-scan optics 60 and the post-scan optics 70 achieves the desired focus in both the scan direction and the process direction at the surface of the photoconductor drum 28.

Figure 6:
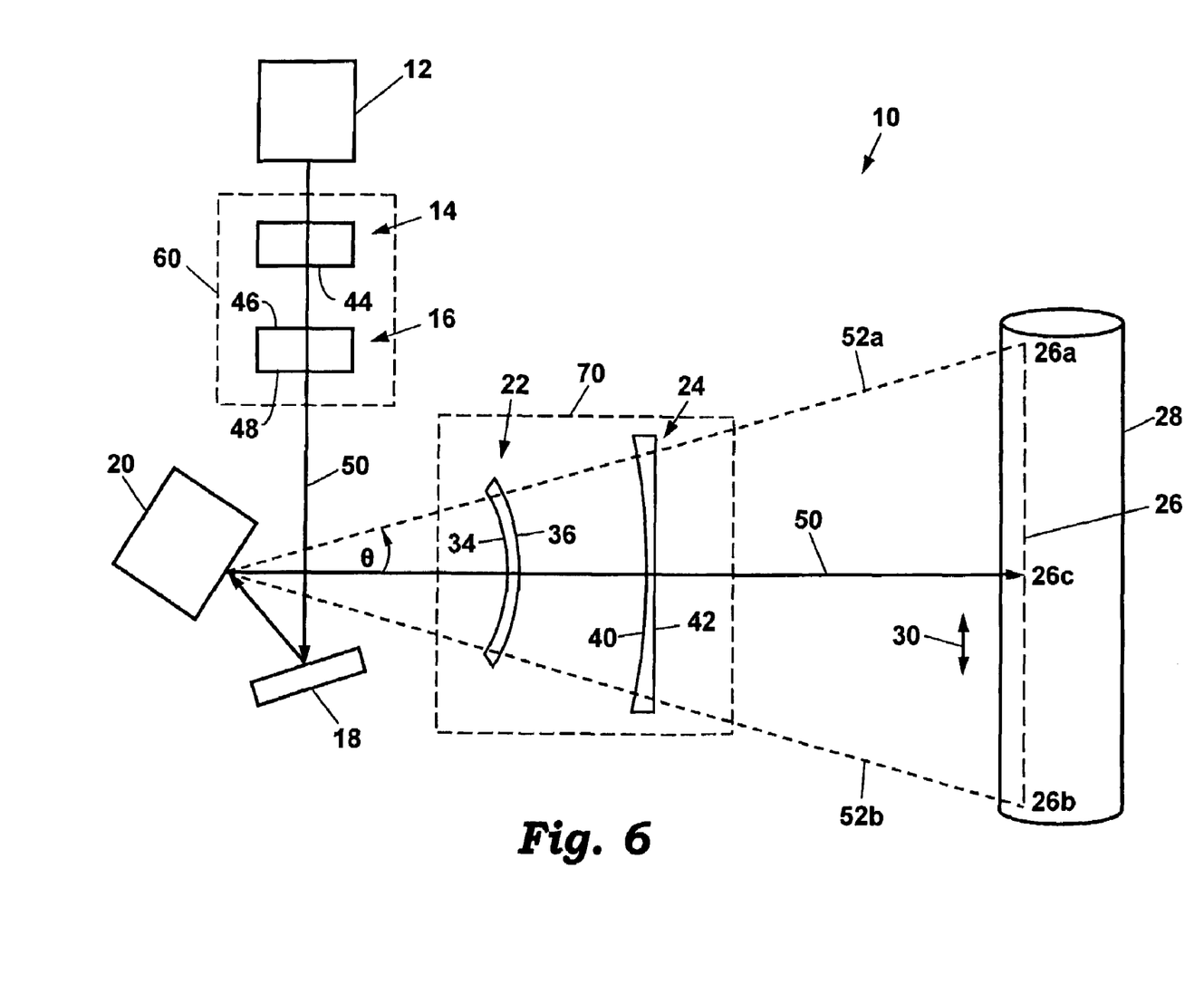
FIG. 6 depicts components of an optical system for correcting scan angle nonlinearity errors produced by a torsion oscillator scanning mirror according to a preferred embodiment of the invention.

Referring to FIG. 6, a preferred embodiment of the optical system 10 for correcting beam scan angle nonlinearity errors produced by a torsion oscillator scanning mirror is depicted. The system 10 includes the laser light source 12, which is preferably a laser diode emitting a light beam 50 at a wavelength of about 780 nanometers (nm). The laser light beam 50 emitted by the light source 12 passes through a collimation lens 14 and then a pre-scan lens 16. The beam 50 may be reflected from a pre-scan mirror 18 such that the beam 50 strikes the mirrored surface of the torsion oscillator 20 on the mirror's axis of rotation. In this embodiment, the pre-scan optics 60 comprise the collimation lens 14 and the pre-scan lens 16.

The torsion oscillator 20 of the preferred embodiment is designed to oscillate a reflective surface through a mechanical angle of rotation of about ±23 degrees. Because the angle of incidence of light on a mirror equals the angle of reflection, the maximum resulting laser scan angle is about ±46 degrees. Generally, only the central region of this sinusoidal scan angle range is used in the writing process. As shown in FIG. 6, this results in a laser scan angle θ of about 31.22 degrees, which provides a writing line 26 having a length of about 216 millimeter (mm) (8.5 inch) at the image plane of the photoconductor drum 28 of the laser printer. The approximate extent of the scan range of the beam 50 is indicated in FIG. 6 by the dashed lines 52a and 52b. In order to decrease the overall size of the laser printer housing, some embodiments of the invention may include a fold mirror that reflects the laser beam generally back toward the torsion oscillator.

To achieve linear dot spacing at the writing line 26, the laser beam 50 passes through first and second post-scan optical lenses 22 and 24 after reflection from the mirror of the torsion oscillator 20. The combination of lenses 22 and 24 causes deflection of the reflected light beam 50 in the scan direction, where the amount of deflection is greater at the edges of the writing line 26 (26a and 26b in FIG. 6) than at a central position, such as indicated by 26c. Because of the increasing beam deflection approaching the edges of the writing line 26, the scan rate of the beam 50 at the edge positions 26a, 26b becomes substantially equivalent to the scan rate at the central position 26c.

In this manner, the lenses 22 and 24 form a non-focusing lens system in the scan direction, the combination of which causes an increase in the spacing of laser dots imaged near the ends of the writing line 26. The combination of lenses 22 and 24 thereby corrects the linearity distortion caused by the sinusoidal angular scan rate of the torsion oscillator 20.

Figure 7A:
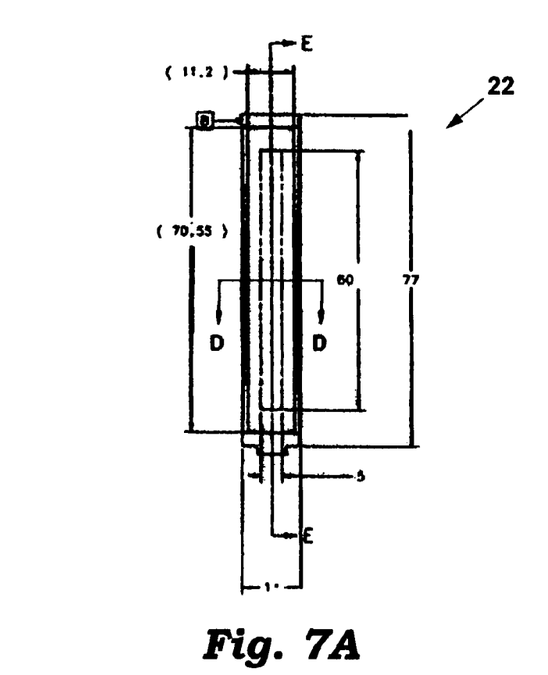
FIGS. 7A, 7B and 7C depict three views of a first post-scan lens referred embodiment of the invention.
Figure 7B:
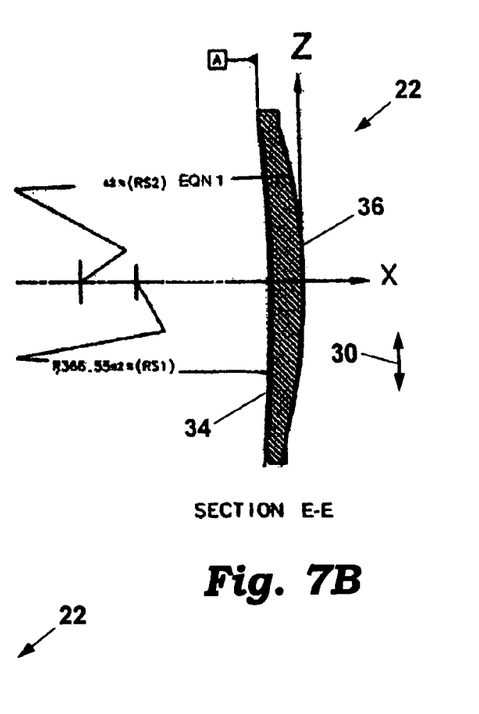
Figure 7C:
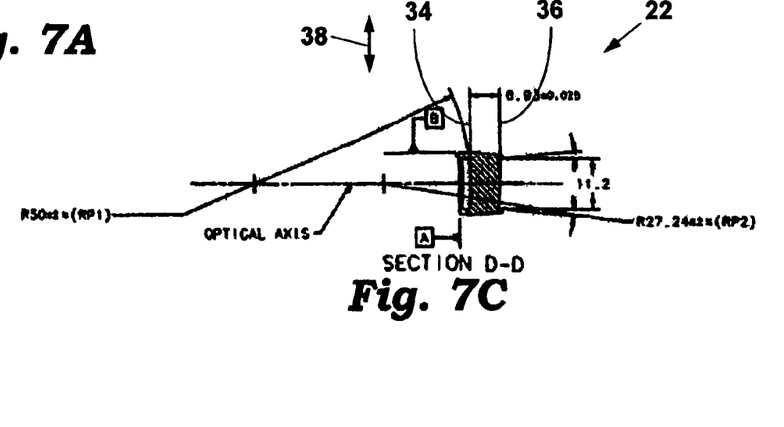
Figure 8A:
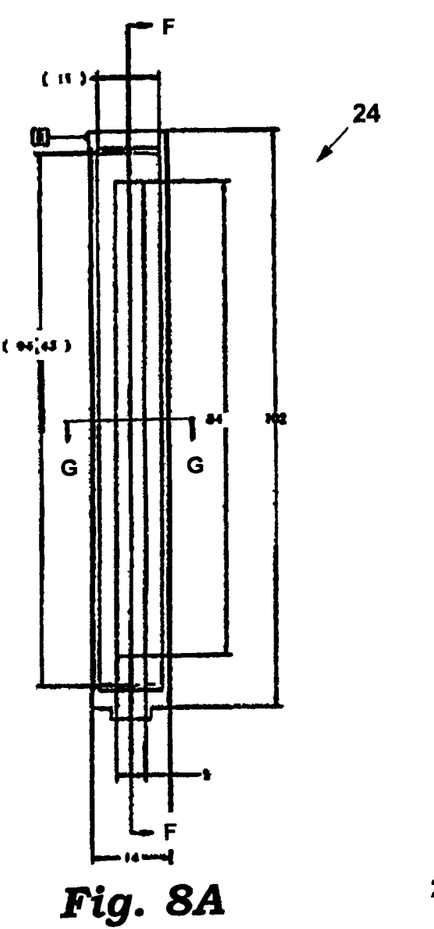
FIGS. 8A, 8B and 8C depict three views of a second post-scan lens referred embodiment of the invention.
Figure 8B:
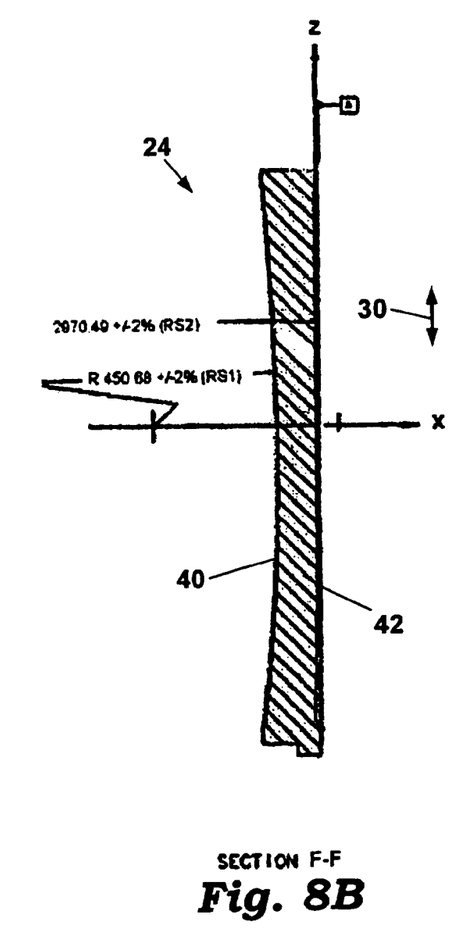
Figure 8C:
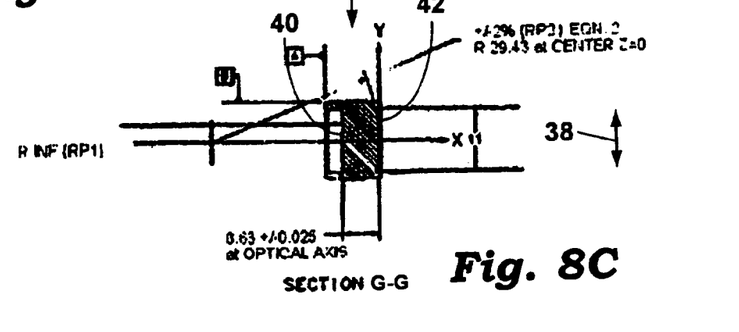

A preferred embodiment of the first post-scan lens 22 is shown in FIGS. 7A, 7B and 7C. A preferred embodiment of the second post-scan lens 24 is shown in FIGS. 8A, 8B and 8C. In the preferred embodiment of the invention, lens 22 and lens 24 are designed to be molded from polymethyl methacrylate (PMMA) or optical acrylic with an index of refraction (n) of 1.48457. However, it will be appreciated that other materials and indices of refraction could be used.

Referring to FIGS. 7B and 7C, the lens 22 has a first surface 34 that is quasi-toric with a concave surface having a fixed radius of curvature (RS1) of 366.55 millimeters (mm) (±2%) in the scan direction (X-Z plane), and a fixed concave radius of curvature (RP1) of 50 mm (±2%) in the process direction (X-Y plane).

The second surface 36 of lens 22 is preferably quasi-toric with a unique convex variable radius of curvature (RS2) in the scan direction (X-Z plane). This variable radius of curvature of the second surface 36 in the X-Z plane (in millimeters) is depicted in FIG. 7B (cross section E-E) and is described according to:

$$X = 0.00 + SAG \quad (1)$$

where:

$$SAG = a_2 \times Z^2 + a_4 \times Z^4 + a_6 \times Z^6 + a_8 \times Z^8 + a_{10} \times Z^{10} + a_{12} \times Z^{12} \quad (2)$$

In the preferred embodiment, the coefficient values of equation (2) in scientific notation are:

$a_2 = -4.07736 \text{ E}^{-3}$; $a_4 = 7.32924 \text{ E}^{-8}$; $a_6 = 1.25673 \text{ E}^{-11}$; $a_8 = 4.71011 \text{ E}^{-15}$; $a_{10} = -2.13737 \text{ E}^{-17}$;

and $a_{12} = 1.29462 \text{ E}^{-20}$.

It should be noted that the smallest radius of curvature described by the polynomial (2) is in the center of the lens 22 on the optical axis (Z=Y=0). In the preferred embodiment depicted in FIG. 7C (section D—D), the convex radius of curvature (RP2) of the second surface 36 of the lens 22 in the X-Y plane is fixed at 27.24 mm±2%. The thickness of the lens 22 on its optical axis (Y=Z=0) is preferably 6.93±0.025 mm.

As shown in the preferred embodiment of FIG. 8B (section F—F), the first surface 40 of the lens 24 is cylindrical with a fixed concave radius of curvature (RS1) of 450.68 mm±2% in the X-Z plane. As shown in FIG. 8C (section G—G), the radius of curvature of the first surface 40 in the X-Y plane is essentially infinite.

The second surface 42 of the lens 24 is preferably quasi-toric with a very slightly convex radius of curvature (RS2) of 2970.49 mm±2% in the X-Z plane. As shown in FIG. 8C, the radius of curvature in the process direction (RP2) of the second surface 42 is 29.43 mm at the center of the lens 24 (Z=0). The radius of curvature of the second surface 42 in the process direction (RP2) preferably varies as a function of Z according to:

$$RP2 = 29.43 + 4.32461 \text{ E}^{-3} \times Z^2 + 1.63684 \text{ E}^{-10} \times Z^4 + 1.11696 \text{ E}^{-17} \times Z^6. \quad (3)$$

Due to the divergence of the beam 50 in the scan direction introduced by the combination of lenses 22 and 24, the post-scan optics 70 alone would not produce a focused spot in the scan direction near the edges 26a, 26b of the writing line 26. In the preferred embodiment of the invention, the pre-scan optics 60 complement the post-scan optics 70 to achieve the desired spot focus in the process and scan directions. In the process direction, the pre-scan optics 60 preferably focus the laser beam 50 on the reflective surface of the torsion oscillator 20. In the scan direction, the pre-scan optics 60 preferably focus the beam 50 to compensate for the diverging, unfocused, spot introduced by the post-scan optics 70 out at the edges 26a, 26b of the writing line 26. Based on the combined optical power of the pre-scan optics 60 and the post-scan optics 70, the laser spot is focused at all points along the complete length of the writing line 26 in both the process direction and the scan direction. An elliptical aperture may also be included in the pre-scan optics 60 to control the final focused spot size in both the scan direction and the process direction.

The function performed by the pre-scan optics 60 of the invention may be implemented in a number of ways. In the preferred embodiment depicted in FIG. 6, the collimation lens 14 of the pre-scan optics 60 is a circularly symmetrical lens having the same positive power in both the scan direction and the process direction. The material of the lens 14 is preferably VC81 glass having an index of refraction (n) of 1.73895. The collimation lens 14 is preferably located about 8.55 mm from the laser source 12. Alone, the preferred embodiment of the collimation lens 14 would focus the laser beam 50 at about 365.45 mm from the second surface 44 of the collimation lens 14, which is substantially equivalent to about 250 mm from the axis of rotation of the torsion oscillator 20. In the preferred embodiment, the image plane, where the laser spot is to be focused, is about 196.882 mm from the axis of rotation of the reflective surface of the torsion oscillator 20. Thus, without correction from the post-scan optics 70, the beam 50 from the collimation lens 14 would be focused at about 53.118 mm beyond the image plane of the photoconductor drum 28.

After exiting the collimation lens 14, the laser beam 50 passes through the pre-scan lens 16. In the preferred embodiment, the pre-scan lens 16 is a plano-cylindrical lens located about 29.5 mm from the laser source 12. The material of the pre-scan lens 16 is preferably BK7 glass having an index of refraction of 1.51119. The cylindrical first surface 46 of the pre-scan lens preferably has a radius of about 71.00 mm in the process direction and an essentially infinite radius of curvature in the scan direction. The planar second surface 48 of the pre-scan lens 16 has an essentially infinite radius of curvature in both directions and thus no optical power in either direction.

In the preferred embodiment of the invention, the radius of curvature of the first surface 46 of the pre-scan lens 16 in the process direction combined with the optical power of the collimation lens 14 in the process direction focuses the laser beam 50 in the process direction on the mirror surface of the torsion oscillator 20 at its axis of rotation. In the process direction, the combination of the lenses 22 and 24 re-images the mirror surface of the torsion oscillator at its axis of rotation onto the writing line 26. This pre-scan focusing technique in the process direction reduces the size of the mirrored target area on the torsion oscillator 20 and reduces visible jitter effects from unwanted off-axis motion of the torsion oscillator 20 as it sweeps through a laser scanning cycle.

While specific embodiments of the invention have been illustrated and described herein, it is realized that numerous modifications and changes will occur to those skilled in the art. It is therefore to be understood that the appended claims are intended to cover all such modifications and changes as follow in the true spirit and scope of the invention.

The invention claimed is:

1. An optical apparatus for compensating for imaging errors associated with a sinusoidal rate of change of an angle of a light beam incident upon an imaging surface of an optical imaging system, where the light beam is produced by a light source, propagates along an optical path from the light source toward a reflective surface of a bidirectional scanning torsion oscillator, and reflects from the reflective surface toward the imaging surface, such that the light beam is scanned in a scan direction at a scan rate from a first edge position on the imaging surface through a central position on the imaging surface to a second edge position on the imaging surface, the optical apparatus comprising a post-scan optical system disposed in the optical path between the reflective surface of the scanning torsion oscillator and the imaging surface of the optical imaging system, the post-scan optical system for causing deflection of the light beam in the scan direction, where the deflection is greater at the first and second edge positions than at the central position, such that the scan rate of the light beam at the first and second edge positions is substantially equivalent to the scan rate at the central position.

2. The optical apparatus of claim 1 further comprising a pre-scan optical system disposed in the optical path between the light source and the reflective surface of the scanning torsion oscillator, the pre-scan optical system for directing the light beam to the reflective surface in a manner that compensates for divergence of the light beam in the scan direction caused at least in part by the post-scan optical system.

3. The optical apparatus of claim 1 wherein the light beam propagates along the optical path in a propagation direction, and wherein the post-scan optical system comprises:
   a first post-scan lens having at least one surface defined by a radius of curvature that varies in the scan direction; and
   a second post-scan lens having at least one surface defined by a radius of curvature that varies in a process direction, where the process direction is orthogonal to the scan direction and the propagation direction.

4. The optical apparatus of claim 3 wherein the first post-scan lens has a concave first surface defined by a fixed radius of curvature in the scan direction and a fixed radius of curvature in the process direction.

5. The optical apparatus of claim 3 wherein the first post-scan lens has a convex second surface defined by a radius of curvature that varies in the scan direction and a fixed radius of curvature in the process direction.

6. The optical apparatus of claim 5 where the radius of curvature in the scan direction of the second surface of the first post-scan lens varies according to a polynomial equation.

7. The optical apparatus of claim 5 where the radius of curvature in millimeters in the scan direction of the second surface of the first post-scan lens is expressed in an X-Z rectangular coordinate system as:

$$X = 0.00 + SAG$$

where $$SAG = a_2 \times Z^2 + a_4 \times Z^4 + a_6 \times Z^6 + a_8 \times Z^8 + a_{10} \times Z^{10} + a_{12} \times Z^{12}$$ millimeter, where $a_2 = -4.07736\ E^{-3}$; $a_4 = 7.32924\ E^{-8}$; $a_6 = 1.25673\ E^{-11}$; $a_8 = 4.71011\ E^{-15}$; $a_{10} = -2.13737\ E^{-17}$; and $a_{12} = 1.29462\ E^{-20}$, where the direction of propagation of the light beam and the scan direction at the first post-scan lens coincide with the X-Z plane of the X-Z coordinate system, and where the X axis of the X-Z coordinate system intersects the center point of the first post-scan lens.

8. The optical apparatus of claim 3 where the second post-scan lens has a first surface defined by a concave fixed radius of curvature in the scan direction and an essentially infinite radius of curvature in the process direction.

9. The optical apparatus of claim 3 where the second post-scan lens has a convex second surface defined by a fixed radius of curvature in the scan direction and a radius of curvature that varies in the process direction.

10. The optical apparatus of claim 9 where the radius of curvature defining the second surface of the second post-scan lens in the process direction varies with scan position.

11. The optical apparatus of claim 9 where the radius of curvature in the process direction of the second surface of the second post-scan lens is expressed as a function of a coordinate Z according to:

$$RP2 = 29.43 + 4.32461\ E^{-3} \times Z^2 + 1.63684\ E^{-10} \times Z^4 + 1.11696\ E^{-17} \times Z^6,$$

where RP2 is the radius of curvature in millimeters in the process direction of the second surface of the second post-scan lens, where the Z-axis is substantially parallel with the scan direction at Z=0 which is the center point of the second post-scan lens.

12. The optical apparatus of claim 2 where the light beam propagates along the optical path in a propagation direction, and wherein the pre-scan optical system comprises:
   a first pre-scan lens having substantially the same focusing characteristics in the scan direction as in a process direction, where the process direction is orthogonal to the scan direction and the propagation direction; and
   a second pre-scan lens having:
      a cylindrical first surface defined by a fixed radius of curvature in the process direction and an essentially infinite radius of curvature in the scan direction; and
      a planar second surface.

13. The optical apparatus of claim 12 where the first pre-scan lens and the second pre-scan lens have dimensions determined such that the light beam propagating along the optical path through the first and second pre-scan lenses is focused in at least the process direction on the reflective surface of the torsion oscillator.

14. The optical apparatus of claim 12 wherein the first pre-scan lens is a collimation lens.

15. An optical apparatus for compensating for imaging errors associated with a sinusoidal rate of change of an angle of a light beam incident upon an imaging surface of an optical imaging system, where the light beam is produced by a light source, propagates along an optical path in a propagation direction from the light source toward a reflective surface of a bidirectional scanning torsion oscillator, and reflects from the reflective surface toward the imaging surface, such that the light beam is scanned in a scan direction at a scan rate from a first edge position on the imaging surface through a central position on the imaging surface to a second edge position on the imaging surface, the apparatus comprising:
   a post-scan optical system disposed in the optical path between the reflective surface of the scanning torsion oscillator and the imaging surface of the optical imaging system, the post-scan optical system for causing deflection of the light beam in the scan direction, where the deflection is greater at the first and second edge positions than at the central position, such that the scan rate of the light beam at the first and second edge positions is substantially equivalent to the scan rate at the central position, where the post-scan optical system comprises:
      a first post-scan lens having at least one surface defined by a radius of curvature that varies in the scan direction; and
      a second post-scan lens having at least one surface defined by a radius of curvature that varies in a process direction, where the process direction is orthogonal to the scan direction and the propagation direction; and
   a pre-scan optical system disposed in the optical path between the light source and the reflective surface of the scanning torsion oscillator, the pre-scan optical system for focusing the light beam on the reflective surface to compensate for divergence of the light beam in the scan direction caused at least in part by the post-scan optical system, where the pre-scan optical system comprises:
- a first pre-scan lens having substantially the same focusing characteristics in the scan direction as in a process direction, where the process direction is orthogonal to the scan direction and the propagation direction; and
- a second pre-scan lens having a cylindrical first surface defined by a fixed radius of curvature in the process direction and an essentially infinite radius of curvature in the scan direction, and a planar second surface.

16. An optical imaging system comprising:
a light source for producing a light beam that propagates along an optical path;
a bidirectional scanning torsion oscillator disposed in the optical path and receiving the light beam, the torsion oscillator having a reflective surface that oscillates while reflecting the light beam, thereby causing the reflected light beam to be scanned at a sinusoidal scan rate in a scan direction across an imaging surface of an imaging device, from a first edge position on the imaging surface through a central position on the imaging surface to a second edge position on the imaging surface;
post-scan optics disposed in the optical path for receiving the reflected light beam from the reflective surface of the scanning torsion oscillator and for causing deflection of the reflected light beam in the scan direction, where the deflection is greater near the first and second edge positions of the imaging surface than near the central position, such that the scan rate of the light beam near the first and second edge positions is substantially equivalent to the scan rate near the central position, thereby compensating for imaging errors associated with the sinusoidal scan rate of the light beam reflected from the reflective surface; and
the imaging device having the imaging surface for receiving the light beam and producing an optical image based thereon.

17. The optical imaging system of claim 16 further comprising pre-scan optics disposed in the optical path for receiving the light beam from the light source and focusing the light beam on a reflective surface of the bidirectional scanning torsion oscillator, and for compensating for divergence of the light beam caused at least in part by the post-scan optics.

18. The optical imaging system of claim 16 where the light source comprises a laser diode.

19. The optical imaging system of claim 16 where the imaging device comprises a photoconductor drum of a laser printer.

20. The optical imaging system of claim 16 where the light beam propagates along the optical path in a propagation direction, and where the post-scan optics further comprise:
- a first post-scan lens having at least one surface defined by a radius of curvature that varies in the scan direction; and
- a second post-scan lens having at least one surface defined by a radius of curvature that varies in a process direction, where the process direction is orthogonal to the scan direction and the propagation direction.

21. The optical system of claim 17 where the light beam propagates along the optical path in a propagation direction, and wherein the pre-scan optics comprise:
- a first pre-scan lens having substantially the same focusing characteristics in the scan direction as in a process direction, where the process direction is orthogonal to the scan direction and the propagation direction; and
- a second pre-scan lens having:
  - a cylindrical first surface defined by a fixed radius of curvature in the process direction and an essentially infinite radius of curvature in the scan direction; and
  - a planar second surface.

22. An optical apparatus for compensating for imaging errors associated with a sinusoidal angular scan rate of a light beam incident upon an imaging surface of an optical imaging system, where the light beam is produced by a light source, propagates along an optical path from the light source toward a reflective surface of a scanning torsion oscillator, and reflects from the reflective surface toward the imaging surface, such that the light beam is scanned in a scan direction from a first edge position on the imaging surface through a central position on the imaging surface to a second edge position on the imaging surface, the apparatus comprising:
- post-scan means for causing deflection of the light beam in the scan direction, the post-scan means disposed in the optical path between the reflective surface of the scanning torsion oscillator and the imaging surface of the optical imaging system, where the deflection caused by the post-scan means is greater at the first and second edge positions than at the central position, such that the scan rate of the light beam at the first and second edge positions is substantially equivalent to the scan rate at the central position; and
- pre-scan means for directing the light beam onto the reflective surface of the torsion oscillator in a manner that compensates for divergence of the light beam in the scan direction caused at least in part by the post-scan means, the pre-scan means disposed in the optical path between the light source and the reflective surface of the scanning torsion oscillator.

* * * * *